(12) United States Patent
Getts

(10) Patent No.: US 9,879,802 B2
(45) Date of Patent: Jan. 30, 2018

(54) HOSE AND CABLE MANAGEMENT SYSTEM

(71) Applicant: Thomas James Getts, Cornelius, NC (US)

(72) Inventor: Thomas James Getts, Cornelius, NC (US)

( * ) Notice: Subject to any disclaimer, the term of this patent is extended or adjusted under 35 U.S.C. 154(b) by 251 days.

(21) Appl. No.: 13/753,259

(22) Filed: Jan. 29, 2013

(65) Prior Publication Data

US 2013/0140407 A1   Jun. 6, 2013

Related U.S. Application Data

(63) Continuation-in-part of application No. 12/537,212, filed on Aug. 6, 2009, now Pat. No. 8,360,371.

(60) Provisional application No. 61/188,133, filed on Aug. 6, 2008.

(51) Int. Cl.
| | |
|---|---|
| *F16L 3/12* | (2006.01) |
| *F16L 3/01* | (2006.01) |
| *F16L 3/223* | (2006.01) |
| *H02G 11/00* | (2006.01) |

(52) U.S. Cl.
CPC ...... *F16L 3/12* (2013.01); *F16L 3/01* (2013.01); *F16L 3/2235* (2013.01); *H02G 11/00* (2013.01)

(58) Field of Classification Search
CPC .. F16L 3/12; F16L 3/2235; F16L 3/01; H02G 11/00
USPC ...................................... 248/572, 125.2, 332
See application file for complete search history.

(56) References Cited

U.S. PATENT DOCUMENTS

| | | | | | |
|---|---|---|---|---|---|
| 2,188,062 | A | * | 1/1940 | Schröder | 242/390.9 |
| 2,489,432 | A | * | 11/1949 | Peters | 242/156.1 |
| 2,916,244 | A | * | 12/1959 | Renfroe | B66C 1/64 105/154 |
| 3,012,756 | A | * | 12/1961 | Cronkright | H02G 1/04 174/169 |
| 3,208,769 | A | * | 9/1965 | Onori | B60D 1/62 138/107 |
| 3,545,724 | A | * | 12/1970 | Wright | H02G 1/04 254/134.3 PA |
| 3,650,545 | A | | 3/1972 | Freed | |
| 3,722,916 | A | * | 3/1973 | Muntjanoff | 280/421 |
| 3,872,881 | A | * | 3/1975 | Miller et al. | 137/355.17 |
| 3,904,843 | A | * | 9/1975 | Kendechy | 200/332 |
| 4,076,272 | A | | 2/1978 | Penton | |
| 4,156,436 | A | | 5/1979 | Hawk | |
| 4,205,453 | A | * | 6/1980 | Steele | B60D 1/38 280/477 |
| 4,372,535 | A | | 2/1983 | Gibson et al. | |
| 4,854,392 | A | | 8/1989 | Frisbee | |
| 4,872,632 | A | * | 10/1989 | Johnson | A47F 5/0892 248/332 |

(Continued)

*Primary Examiner* — Muhammad Ijaz

(74) *Attorney, Agent, or Firm* — Memminger E. Wiggins

(57) ABSTRACT

The invention is a suspension apparatus for maintaining conduits (hoses, cables, wires, tubing) in desirable positions to prevent abrasion, drag, and friction damage. The suspension apparatus connects a conduit guide engaging the conduits to a tension reel via a tension cable that maintains the conduits at a proper elevation and placement. The tension reel may be enclosed in a housing and attached to a structure with an appropriate bracket. The suspension apparatus may be used to ensure that tractor and trailer combinations have conduits maintained in place such that the conduits are not damaged during use.

5 Claims, 11 Drawing Sheets

(56) References Cited

U.S. PATENT DOCUMENTS

| | | | |
|---|---|---|---|
| 5,143,392 A | 9/1992 | Collins | |
| 5,346,233 A | 9/1994 | Moser | |
| 5,405,160 A * | 4/1995 | Weaver | B60D 1/38 |
| | | | 280/477 |
| 5,480,171 A | 1/1996 | Cheffey | |
| 5,645,147 A * | 7/1997 | Kovacik et al. | 191/12.2 R |
| 5,699,991 A * | 12/1997 | Melinyshyn | B66D 3/04 |
| | | | 248/332 |
| 5,713,592 A | 2/1998 | Dunell | |
| 5,918,640 A * | 7/1999 | Orcutt | F16L 11/22 |
| | | | 138/109 |
| 5,941,507 A * | 8/1999 | Page | B65H 57/14 |
| | | | 254/134.3 PA |
| 6,315,269 B1 * | 11/2001 | Fleury | B66D 3/046 |
| | | | 254/134.3 PA |
| 6,367,238 B1 * | 4/2002 | Fischer | F16G 13/16 |
| | | | 248/49 |
| 6,463,625 B2 * | 10/2002 | Mittag | E05D 15/0639 |
| | | | 16/105 |
| 6,467,713 B1 * | 10/2002 | Watanabe | A61H 1/0218 |
| | | | 242/375.1 |
| 6,651,940 B2 | 11/2003 | Hill, Sr. | |
| RE38,463 E * | 3/2004 | Anderson | G09F 7/18 |
| | | | 248/329 |
| 6,902,180 B2 | 6/2005 | Baginski | |
| 6,926,027 B1 * | 8/2005 | Sorensen | B65H 75/425 |
| | | | 137/351 |
| 7,086,659 B2 | 8/2006 | Baginski | |
| 7,182,146 B2 | 2/2007 | Erickson et al. | |
| 7,966,941 B1 * | 6/2011 | Brannan | A63G 21/22 |
| | | | 104/112 |
| 8,360,371 B2 * | 1/2013 | Getts | F16L 3/01 |
| | | | 242/370 |
| 8,408,501 B2 * | 4/2013 | Noyes et al. | 248/75 |
| 8,505,570 B2 * | 8/2013 | Wimmer | 137/355.17 |
| 8,950,538 B2 * | 2/2015 | Kurauchi | E02F 9/08 |
| | | | 172/813 |
| 9,350,145 B2 * | 5/2016 | Jean | H02G 1/02 |
| 2003/0038102 A1 * | 2/2003 | Flint et al. | 213/1.3 |
| 2006/0249636 A1 * | 11/2006 | Thiedig | F16L 3/1091 |
| | | | 248/74.4 |
| 2007/0114503 A1 * | 5/2007 | Baughman | B65H 75/305 |
| | | | 254/134.5 |
| 2009/0194992 A1 * | 8/2009 | Bochenek et al. | 285/61 |
| 2009/0200434 A1 * | 8/2009 | Noyes | F16L 3/1025 |
| | | | 248/58 |
| 2010/0032531 A1 * | 2/2010 | Getts | F16L 3/01 |
| | | | 248/58 |
| 2010/0224581 A1 * | 9/2010 | Hsien | D06F 53/04 |
| | | | 211/117 |
| 2011/0204306 A1 * | 8/2011 | Kingery | B66D 3/046 |
| | | | 254/391 |
| 2013/0140407 A1 * | 6/2013 | Getts | F16L 3/12 |
| | | | 248/58 |
| 2015/0275465 A1 * | 10/2015 | Zimmerman | E02F 3/404 |
| | | | 414/722 |
| 2016/0029827 A1 * | 2/2016 | Finnin, Jr. | A47G 33/1206 |
| | | | 248/524 |
| 2017/0259791 A1 * | 9/2017 | Kimener | B60S 9/20 |

* cited by examiner

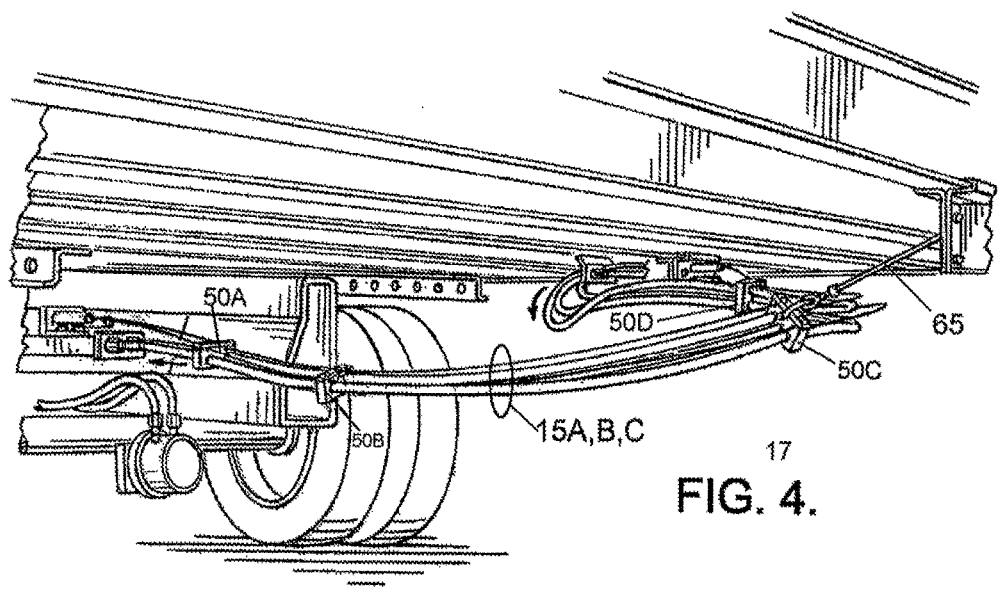
FIG. 4.
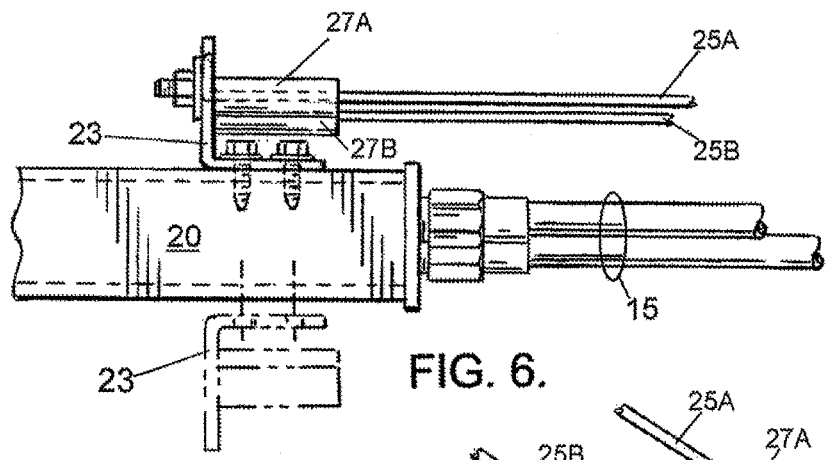
FIG. 6.
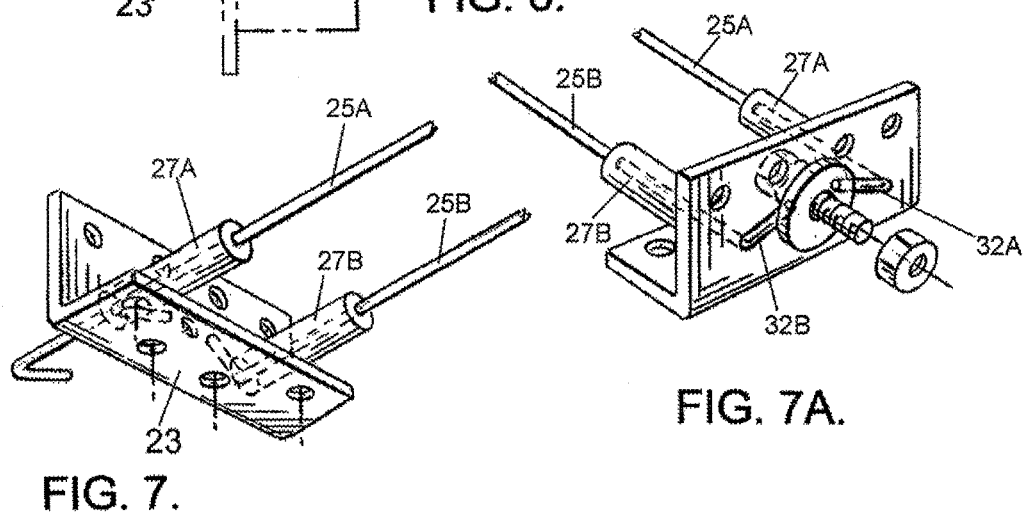
FIG. 7.
FIG. 7A.

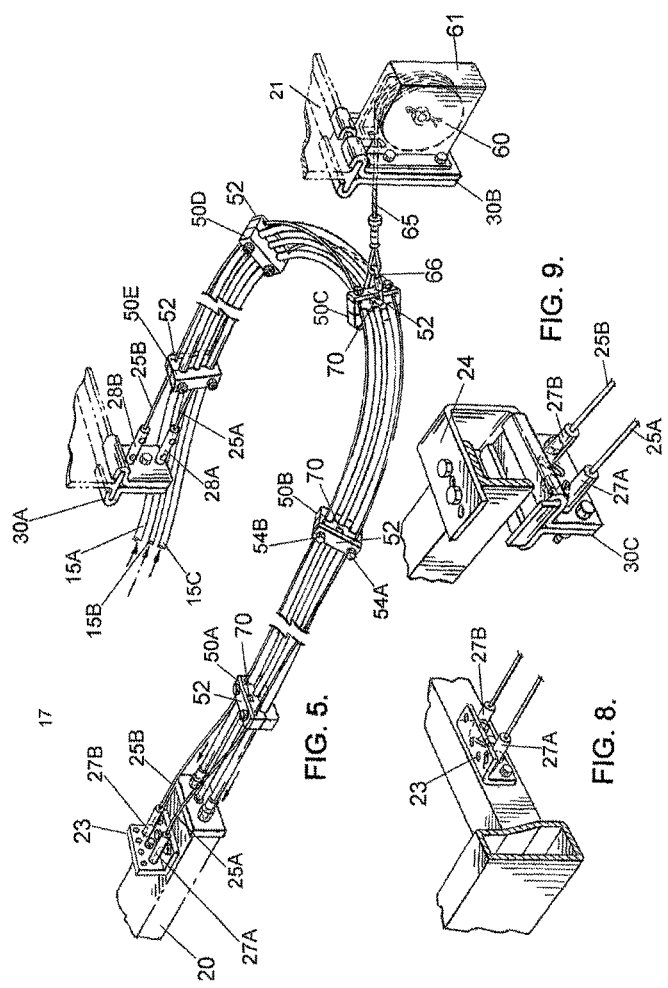

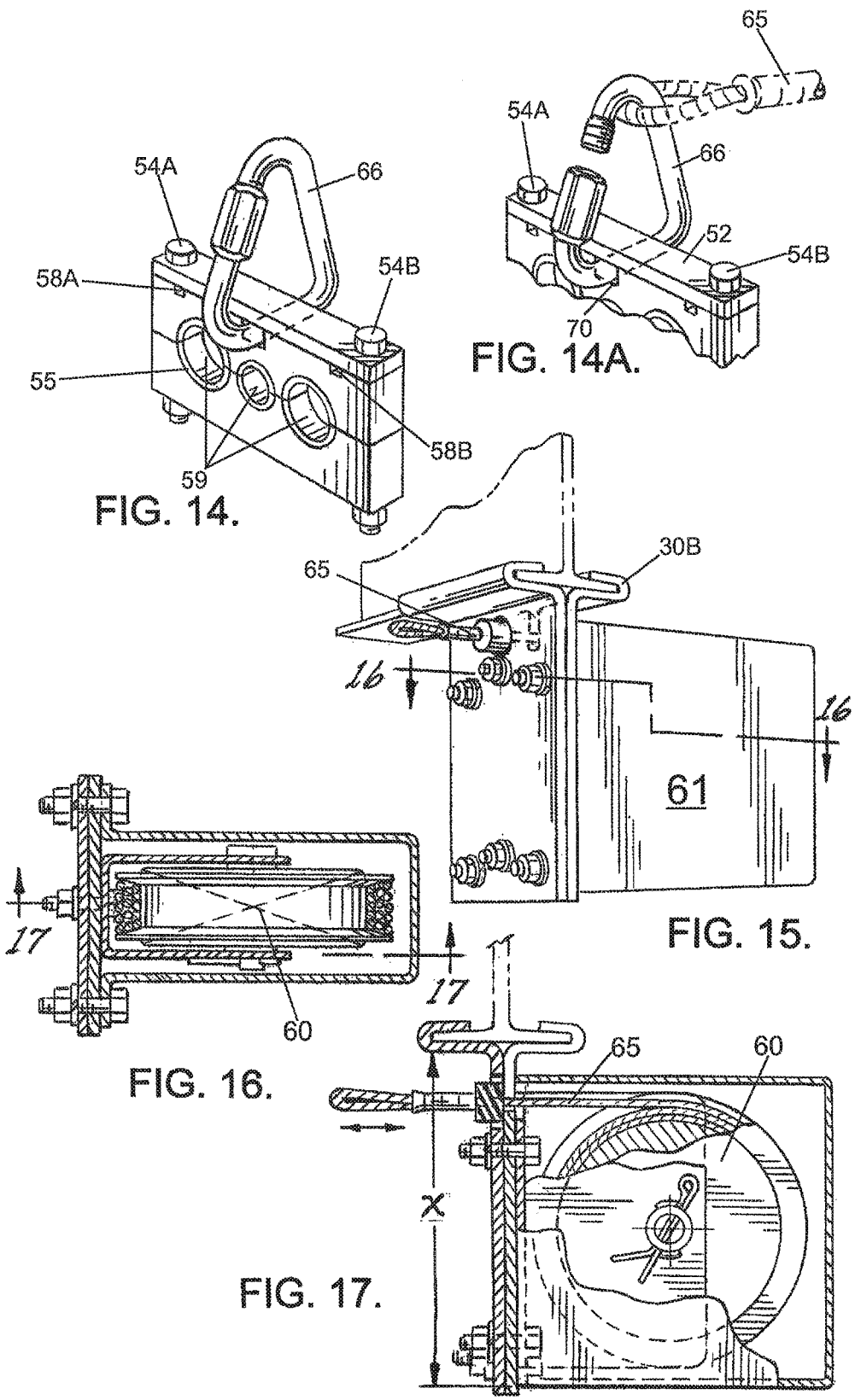

HOSE AND CABLE MANAGEMENT SYSTEM

CROSS REFERENCE TO PRIOR APPLICATIONS

This application is a continuation in part of U.S. patent application Ser. No. 12/537,212 filed on Aug. 6, 2009, now U.S. Pat. No. 8,360,371 that issued on Jan. 29, 2013, to the inventor named herein. This application also claims priority to and incorporates by reference herein U.S. Provisional Patent Application Ser. No. 61/188,133 filed on Aug. 6, 2008 and entitled "Hose and Cable Management System."

FIELD OF THE INVENTION

This invention relates to an apparatus which dynamically supports flexible cables and hoses, collectively referred to as conduits. Specifically, without restriction to the particular uses which are shown and described, this invention relates to a dynamic support system for the hoses and cabling which extend between a sliding, tandem tractor-trailer rig.

BACKGROUND OF THE INVENTION

A number of devices have been utilized to support and control the movement of flexible cabling and conduits. The typical method to support the hoses and cabling which extend between a sliding, tandem tractor-trailer employs rubber and stamped metal components. These components support the hoses and cabling and connect these hoses and cables to the trailer floor or trailer floor support beams with one or more closely wound extension springs (FIG. 3).

Another type of device is U.S. Pat. No. 4,156,436 which relates to a shackle system utilized to control the movement of hydraulic hoses and electrical cabling which extend between the pivotal portions of a vehicle, such as an earth-moving wheeled scraper in the construction industry. The conduits are conformed in a large loop to prevent damage and are constrained or tethered together to prevent twisting. The hoses are secured to a shackle carried upon a plastic covered wire rope which is anchored at each of its ends to portions of the vehicle. A pair of cross braces extends between opposite parallel sides of the shackle. The hoses are connected to one side of the shackle by adjustable flexible straps which extend between opposite parallel sides of the shackle and are positioned between the ear portions and the ends of the shackle for securing the conduits against the shackle.

U.S. Pat. No. 4,076,272 relates to system for retracting and extending flexible hoses which connect a fluid power system on a first vehicle to a fluid power system on a second vehicle, such as between a truck tractor and one or more detachable truck trailers. A rigid housing is mounted on the truck tractor or trailer, or both. In the housing tension springs are mounted and secured at one end to loops of excess hose within the housing so that the free ends of the hoses may be extended from the housing under tension and affixed to appropriate fittings on the trailer. The springs take up the slack by pulling the excess hose into the housing in order to avoid exposed loops of hose which could be readily damaged.

U.S. Pat. No. 4,854,392 is a hose positioning and tensioning assembly for maintaining constant tension on a hydraulic hose arch in order to keep it in an upright position. A clamp holds the hoses in a group. A pulley cable which is rotatably mounted extends from the clamp and over the pulley for attachment to a coil type extension spring. The extension spring is connected between the cable and a fixed member.

U.S. Pat. No. 3,650,545 provides a component for supporting and guiding flexible lines which extend between interconnected vehicle components. The component includes a releasable flexible clamp which holds the flexible lines in a group.

U.S. Pat. No. 5,143,392 relates to a heated box assembly for retractable hoses which is mounted on a tractor trailer chassis behind a cab. When not in use, each air hose and electrical cable is stored within the case on respective reels. The reels are spring loaded and permit the payout of air hose and electric cable as required, and the uptake and storage of the same as required.

U.S. Pat. No. 7,182,146 relates to a constraint assembly configured to support a series of hoses associated with the operation of an agricultural implement. The flexible lines extend along the tongue assembly of the implement. The constraint assembly employs four holder assemblies. The constraint assembly, in combination with the series of holder assemblies, secures the flexible lines to the frame of the implement in a manner such that the flexible lines have less opportunity to kink or undergo undesired wear and tear.

U.S. Pat. No. 5,713,592 relates to an apparatus for supporting vehicle conduit which extends between a prime mover and a trailer. The apparatus comprises an elongate member to support the conduit. The apparatus is rotatably mounted to the leading or trailing vehicle such that the elongate member can swing in response to angled movement between the leading and trailing vehicles.

U.S. Pat. No. 6,651,940 relates to an apparatus for supporting cable and hose between the tractor and trailer of a tractor-trailer rig. The apparatus includes an attachment member that can be engaged with straps to support cables and hoses.

U.S. Pat. No. 7,086,659 relates to a system for routing an elongated line over a tractor for powering a component of a trailer. FIG. 1A refers to a three position clamp in the prior art which is used to support and hold hoses and cables in a group.

Tractor trailer rigs consist of a self-propelled vehicle to which a trailer or multiple trailers are attached. Tractor trailer rigs are subject to extensive federal and state weight regulations. The violation of these restrictions can result in substantial fines and penalties. To compensate for these weight restrictions and to provide for the safe operation of the rigs, trailers have been built to help distribute weight more evenly. These trailers, known as "sliders," have a sliding tandem axle that moves forward and backward to help balance the weight more evenly to all of the tractor-trailer's axles.

If a tractor-trailer rig is not in compliance with the weight restrictions when stopped for a random weight measurement the operator must properly redistribute the weight before the truck can legally continue. To redistribute the trailer weight, truck operators generally remove a hand activated lever mechanism and the pins of the carriage. The operators then use the power of the vehicle cab to move the trailer bed over the dual tandem wheels. The movement of the axles when a trailer is fully loaded can be a considerable and time consuming task, and may be particularly problematic in inclement weather. (See U.S. Pat. No. 5,346,233).

The rear axles of tractor-trailers are provided with hydraulic or pneumatic brakes and electrical traffic indicators. The hydraulic, pneumatic, electric or other forms of energy necessary to operate the brakes and signals are provided through conduits (hoses and cabling) which are connected with the vehicle, or another trailer in a multiple trailer rig. The conduits are flexible and it is necessary to control the movement of these conduits in order to prevent damage which may be caused by tandem slider operation and exposure to the road or road debris. If a hydraulic or pneumatic hose is damaged it can cause the trailer brakes to fail and the rig to become uncontrollable. Damage to the electrical cabling can create an explosion if exposed to a combustible environment or the risk of electric shock. Even if there is no loss or interruption of electrical or hydraulic power cabling and hose wear may result in frequent replacement.

Existing components (FIG. 3) do not support the truck trailer tandem slider brake lines and electrical cables well which can exacerbate the already difficult job of repositioning the slider. The hoses and cables and their related fittings are exposed to snags and may be stretched and fatigued during redistribution of the trailer weight through tandem slider operation. The springs of the existing support components are also regularly stretched and permanently deformed beyond their intended operational range during the forces which are applied during trucking operations. When this happens the brake hoses and electrical cables are also stretched and fatigued, and the entire assembly hangs near the road level and can be damaged by road debris hitting the components. Stretching may also accelerate fatigue due to increased exposure to weather conditions. An increased risk of hooking is also presented during trailer loading and unloading at loading docks. As a result of these risks, the existing hose and cable attachment components require regular, scheduled preventative maintenance because they must be periodically checked to insure that they have not prematurely worn.

A need continues to exist in the field of hose and cable management for a system that allows for guidance, support and safety while relaying pneumatic, electrical, hydraulic and other forms of energy from fixed sources to moving mechanisms.

BRIEF SUMMARY OF THE INVENTION

In one embodiment, a suspension apparatus maintains the position of conduits subject to dislocation relative to an associated moveable mounting. The apparatus includes least one conduit guide defining at least one bore through which the conduit extends. A tension reel is connected to the mounting by a support mechanism. A tension cable is connected to the conduit guide at one end and connected to the tension reel at an opposite end, wherein the length of the tension cable extending off the tension reel adjusts in response to movement of the mounting and controls the associated dislocation of the conduits. A roller is connected to the support mechanism and receives the tension cable across the roller.

In another embodiment, a suspension apparatus maintains the position of conduits subject to dislocation relative to an associated moveable mounting. The apparatus includes least one conduit guide defining at least one bore through which the conduit extends. A tension reel is connected to the mounting by a support mechanism. A tension cable is connected to the conduit guide at one end and connected to the tension reel at an opposite end, wherein the length of the tension cable extending off the tension reel adjusts in response to movement of the mounting and controls the associated dislocation of the conduits. An eye bolt is connected to the support mechanism and receives the tension cable across the roller.

In yet another embodiment, a suspension apparatus holds at least one conduit installed on a tractor and trailer combination at an elevated position relative to a ground surface below. The suspension apparatus includes at least one conduit guide defining at least one bore through which the conduit extends. A tension reel is connected to either the tractor or the trailer by a support mechanism. A tension cable is connected to the conduit guide at one end and connected to the tension reel at an opposite end, wherein the length of the tension cable extending off the tension reel adjusts in response to movement of the tractor or the trailer and controls the associated dislocation of the conduits.

BRIEF DESCRIPTION OF THE DRAWINGS

FIG. 4 is an illustration of the suspension apparatus according to this invention with a tensioning cable ensuring that guy wires maintain conduits in an elevated position.

FIG. 5 is a perspective view of the components of the suspension apparatus of this invention.

FIG. 6 is a side view of one bracket holding one end of the guy wires associated with the suspension apparatus of this invention.

FIG. 7 is a side view of the bracket used to hold one end of the suspension apparatus according to this invention.

FIG. 7A is a rear view of the bracket used to hold one end of the suspension apparatus according to this invention.

FIG. 8 is a perspective view of a bracket used to install the suspension apparatus on the side of a mounting surface.

FIG. 9 is a perspective view of an adapter used to incorporate I-beam brackets in the installation of one end of the suspension apparatus of this invention.

FIG. 14 is a perspective view of the conduit guide of this invention with a shackle disposed thereon for connecting to the tension cable as described herein.

FIG. 14A is a perspective view of the conduit guide of FIG. 14 with the shackle unscrewed to an open position for connecting to the tension cable as described herein.

FIG. 15 is a perspective view of the tension reel enclosed in a tension reel box and connected to an I-beam according to this invention.

FIG. 16 is a top cross sectional view of the tension reel of FIG. 15.

FIG. 17 is a cut-away view of the tension reel winding a tension cable within a tension reel box according to the suspension system described herein.

DETAILED DESCRIPTION

The invention described herein provides a mechanical apparatus and system for supporting hoses, cables, lines, wires, tubing, and the like (collectively referred to herein as "conduits"). Typically, such equipment is used to transmit energy (e.g., pneumatic, hydraulic, electric) or fluids (e.g., air, water, oils) in a mechanical environment. Without limiting the scope of the invention, the apparatus and system described herein is particularly useful in reducing the likelihood of hose and cable failure due to excessive movement, stretch, or fitting fatigue in industrial environments of all types (e.g., robotics, manufacturing, tractor-trailers, agricultural equipment, synchronous and asynchronous machining). In one embodiment, the invention helps to ensure that conduits of all kinds are maintained in an appropriate and useful setting without dragging, kinking, or being subject to unnecessary wear and tear. The invention can be used in multiple settings that include moving parts requiring positional adjustments to conduits that are essential to proper operation.

The drawings incorporated herein show the invention in the context of a trucking installation, particularly a tractor and trailer combination. One should note, however, that the trucking industry is only one application for the invention, and the drawings are for exemplary purposes only (i.e., the scope of the drawings do not limit the invention).

Figure 1:
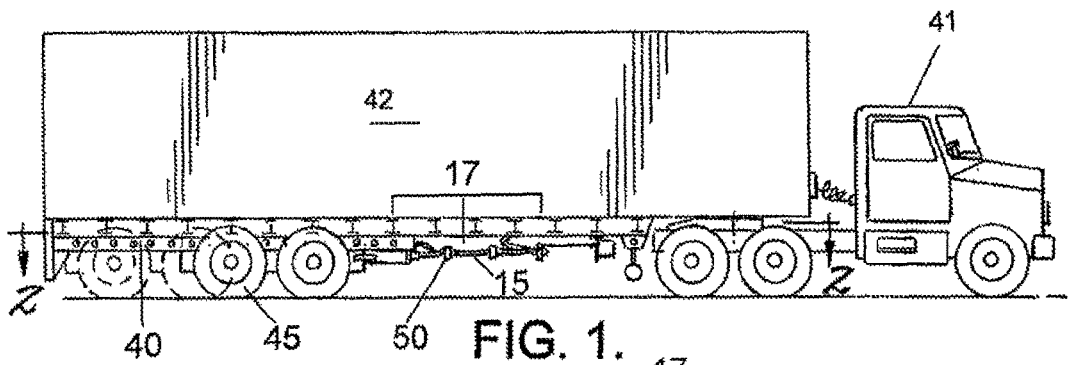
FIG. 1 is perspective view of the suspension apparatus for conduits according to this invention and installed in a trucking environment.
Figure 2:
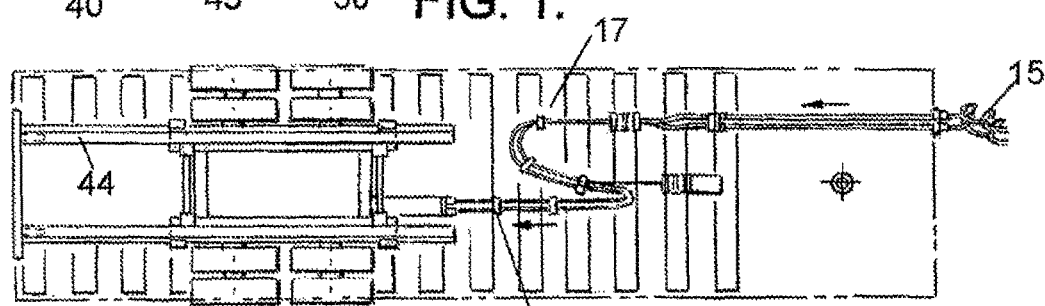
FIG. 2 is a bottom view of the suspension apparatus used in the tractor-trailer installation of FIG. 1.

Overall, the invention is a conduit suspension system (17) that holds conduits of all kinds in the best position to maintain their integrity during use by minimizing abrasion, kinking, dragging, and other forces that induce inefficient wear and tear on the conduits. FIGS. 1 and 2 show an exemplary installation of the conduit suspension system of this invention on a tractor and trailer combination (41, 42). The conduit suspension system (17) maintains a constantly elevated and stable position for hoses and cables running from primary sources (likely the tractor (41)) out to the trailer components (e.g., conduits for electrical systems, hydraulic systems, and pneumatic systems). The hoses and cables are shown as conduits (15) running under the trailer (42). Keeping these conduits (15) from dragging the ground or kinking during trailer (42) movement is a primary concern. The problem of conduit drag and conduit kinking is even more acute in tractor-trailer rigs (41, 42) that utilize tandem trailers, known as tandem sliders. In a tandem slider (42), the wheel base (40) may be positioned at numerous points along a rail (44) running under the trailer (42). In this way, the trailer wheels (45) can be positioned closer to the actual load on the trailer (42). When the trailer (42) is not carrying a full load, the wheel base (40) can be moved closer to the tractor along the rail (44), a more efficient position when the force of the load is closer to the front of the trailer (42). When the trailer is carrying materials that run the entire length of the trailer, then the wheel base (40) slides to the rear of the trailer, as shown in the dotted lines of FIG. 1.

A problem arises in moving the trailer, and particularly in moving the wheel base closer to the tractor, because the conduits (15) tend to drag as the distance from their point of origin is shortened. When the conduits (15) are allowed to drag along the ground during travel, the conduits (15) are subject to harsh conditions and are likely to fail, leading to serious loss of functionality. For example, one of the conduits (15A) may control braking function, and when the conduit fails due to dragging on the ground during travel, the brakes on the trailer (42) may not work. In response to the seriousness of the problem, the conduit suspension system (17) ensures continuously controlled placement of all conduits (15) no matter how much the trailer (42) or wheel base (40) move back and forth.

Figure 3:
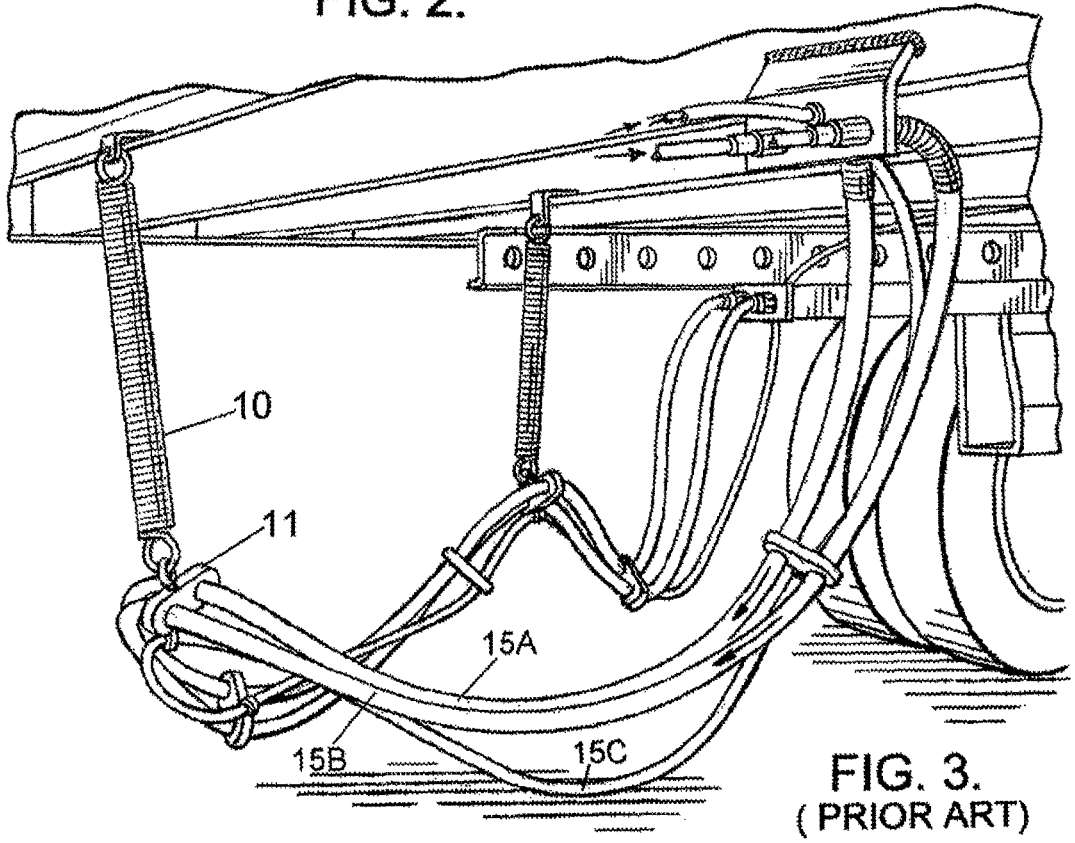
FIG. 3 is a prior art method of ensuring that conduits remain elevated during use in trucking environments.

Other attempts at maintaining proper placement of hoses and cables in a trucking environment have included simple mechanisms such as those shown in FIG. 3. The apparatus of FIG. 3 utilizes a series of cords or springs (10) connected by clips (11) to lift conduits (15A, 15B, 15C) off the ground. This prior art system, however, does not allow for any translation of components under the trailer (42), such as the tandem slider shown in FIG. 1. A more dynamic approach is necessary when individual portions of the mechanism to which the conduits (15) attach are movable in various directions.

In the drawings associated with this description, the conduit suspension apparatus (17) is connected to the underside of the trailer (42) and the wheel base (40). The wheel base (40) includes a projection known as the "snorkel" (20). The drawings show I-beams on the underside of the trailer (42) and the snorkel (20) on the wheel base (40) as attachment points for the conduit suspension apparatus (17). These tractor-trailer components, however, are not the exclusive uses of the system. For clarity, therefore, the remainder of this detailed description uses the term "mounting" to describe the mechanisms and physical structures to which the suspension apparatus attaches. For purposes herein and without limiting the invention, the term "mounting" can be any physical structure supporting the suspension apparatus (17).

The suspension apparatus (17) of this invention is shown in a wide perspective view at FIG. 5. This drawing shows a suspension apparatus (17) for maintaining the position of conduits (15) subject to dislocation relative to an associated moveable mounting (20, 21A, 21B). The suspension apparatus (17) includes at least one conduit guide (50A-50E) defining at least one bore (59A-59C) through which the conduits (15A-15C) extend; at least one guy wire (25A, 25B) extends through the respective conduit guides (50), and the guy wire ends connect to the appropriate mountings (20, 21A). In FIG. 5, the guy wires (25A, 25B) support the conduit guides (50A-50E) in a desirable position. A tension reel (60) is connected to yet another mounting (21B) at a separate location proximate the conduits. A tension cable (65) connects to one of the conduit guides (50) at one end and connects to the tension reel (60) at an opposite end. The length of the tension cable (65) extending off the tension reel (61) adjusts in response to movement of the mountings (20, 21A, 21B) and controls the associated dislocation of the conduits (15A-15C). As noted above, the mountings include the snorkel (20), a first I-beam (21A) supporting the trailer (42) and a second I-beam (21B) also associated with the trailer. Appropriate brackets (23, 30A, and 30B) are used to connect to the mountings (20, 21A, 21B).

The tension cable (65) maintains the conduit guides (50A-50E) at a substantially constant elevation to ensure that the conduits (15A-15E) are in a safe location for optimal functionality. When a mounting connecting portions of the suspension apparatus (17) moves, then the guy wires (25A, 25B) adjust the position of the conduits via the conduit guides.

In one embodiment of the invention, the wheel base (40) may be positioned in various locations along the slider rail (44) on the underside of the trailer (42). To accomplish these various positions, the driver will likely engage brakes on the wheel base (40) to ensure that the wheel base remains stationary and then push the trailer (42) backward and forward with the tractor (41). In this regard, the snorkel (20) will be substantially stationary, while the I-beam mountings (21A, 21B) will move forward and backward with the trailer (42). Accordingly, the overall mounting for the suspension apparatus (17) will include a translating portion (I-beams 21A, 21B) and a stationary portion (snorkel 20).

The suspension apparatus (17) disclosed herein has a useful design to account for the distinction between stationary and translating mountings in the same installation. The suspension apparatus (17) is attached to its mounting (20, 21A, 21B) and the entire installation is maintained on a supporting surface, such as a building floor, or in the case of a truck, the ground. In other words, for purposes herein and without limiting the invention, the supporting surface can be any weight bearing fixture, including the ground, that is the overall platform for the application at hand.

As shown in FIG. 5, respective first ends of first and second guy wires (25A, 25B) are connected to one mounting, such as the snorkel (20), in a substantially horizontal plane relative to the supporting surface. Respective second ends, opposite the first ends of the first and second guy wires, are connected to a different mounting (or a different section of the same mounting) (21A) in a substantially vertical plane relative to the supporting surface. This set-up allows for the curvature of the guy wires and results in the guy wires being of equal length. The curvature also prevents kinking of associated conduits.

In a different embodiment, when the mountings (20, 21) have a translating portion and stationary portion, the suspension apparatus includes first and second guy wires extending through the conduit guides (50A-50E) and connected at both ends to the mountings (20, 21A). Respective first ends of the guy wire (25A) and the second guy wire (25B) are connected to the stationary portion (20) of the mounting, and respective second ends of the guy wire (25A) and the second guy wire (25B) are connected to the translating portion (21A) of the mounting. In a suspension apparatus (17) according to this embodiment, the respective first ends of the guy wires (25A, 25B) are connected to the stationary portion (20) of the mounting such that the guy wire (25A) and the second guy wire (25B) are substantially horizontal relative to a surface supporting the mounting. Respective second ends of the guy wires (25A, 25B) are connected to the translating portion (21A) of the mounting such that the guy wire (25A) and the second guy wire (25B) are substantially vertical relative to the surface supporting the mounting.

The juxtaposition of horizontal and vertical ends of the respective guy wires (25A, 25B) has a profound effect on the position of the conduit guides (50A-50E) supported by the guy wires (25A, 25B). As shown in FIG. 5, when the ends of the guy wires (25A, 25B) are connected horizontally at one end and vertically at the other end, the conduit guides (50A-50E) are subject to increasing angular positions along the guy wires (i.e., the conduit guides "turn" from substantially horizontal to substantially vertical along the length of the guy wires). These intermittent and variably positioned conduit guides (50A-50E) allow the conduits (15A-15C) to adjust to proper curvature—a curvature that changes when the translating portion (21A, 21B) of the mounting moves in relation to the stationary portion (20) of the mounting. Again, the desirable effect of the guy wire installation is controlled position of the conduit guides (50A-50E) and the conduits (15A-15C) therein even when all or portions of the associated mounting moves. Ultimately, this embodiment also includes a tension reel (60) that connects to at least one of the conduit guides (50) via a tension cable (65). The tension reel is associated with the movable or translating portion of the mounting so that the tension cable adjusts its length to the extent necessary for the guy wires (25A, 25B) and conduit guides (50A-50E) to maintain the conduits (15A-15C) in a stable position.

This embodiment of the invention is best summed up, without limitation, as a suspension apparatus (17) for elevating multiple conduits (15A-15C) installed on a tandem trailer (42) having an adjustable wheel assembly (40) connected to the tandem trailer (42). The suspension apparatus (17) includes:

(A) a tension reel (61) connected to the tandem trailer (42);

(B) a pair of guy wires (25A, 25B) supporting a series of conduit guides (50A-50E) spaced apart along a length of the conduits (15A-15C), wherein:
  (i) the conduits (15A-15C) extend through bores (59A-59C) in the conduit guides (50A-50E);
  (ii) each guy wire (25A, 25B) in the pair of guy wires is connected to the tandem trailer (42) at one guy wire end and connected to the adjustable wheel assembly (40) at an opposite guy wire end; and
  (iii) wherein relative angular positions of the conduit guides (50A-50E) progressively change from a substantially horizontal position proximate the wheel assembly (40) to a substantially vertical position proximate the guy wire end connected to the tandem trailer (42), the angular positions minimizing conduit bend in response to movement of the tandem trailer (42) in relation to the wheel assembly (40); and (C) a tension cable (65) having first and second cable ends, the first cable end connected to one of the conduit guides (50) and the second cable end connected to the tension reel (60) such that when the tandem trailer (42) moves in relation to the wheel assembly (40), the tension cable adjusts in length to maintain the angular positions of each conduit guide (50A-50E).

The view shown in FIG. 4 illustrates the suspension apparatus in operation when the wheel base has been moved closer to the front of the truck, increasing the slack in the conduits. Without the assistance of the suspension apparatus, the conduits would drag the ground or the road and would be breached by frictional forces. With the guy wires formed of sufficiently stiff steel or alloys, the guy wires bend but maintain a constant elevation for each conduit guide, especially those on the far end (50D and 50E). Again, the tension cable (65) is reeled inwardly to a shorter length to ensure that the suspension apparatus maintains a sufficient elevation to clear the ground below.

Figure 10:
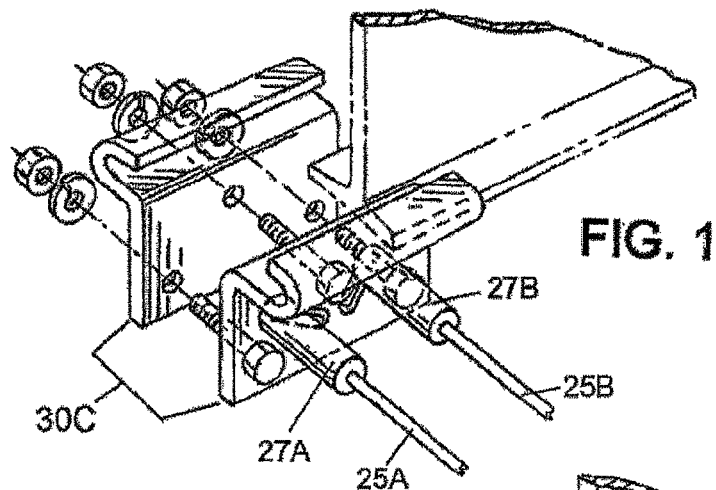
FIG. 10 is an exploded view of the bracket used for installing one end of the suspension apparatus of this invention with guy wires connected in a horizontal orientation.

FIGS. 6, 7, 7A, 8, and 9 show various embodiments of the brackets that can be used to install one end of the guy wires to a mounting. FIG. 6 is a side view of the bracket used to hold the guy wires in place on the snorkel. The bracket (23) bolts onto the top of the snorkel (20) and includes outwardly extending posts (27A, 27B) through which guy wires (25A, 25B) extend. Shown in phantom lines is an alternative approach that bolts the bracket (23) onto the bottom of the snorkel. FIGS. 7 and 7A show the same bracket (23) from different perspectives and include a rear view showing that the guy wires (25A, 25B) have bent ends termination within recesses (32A, 32B) in the bracket (23). FIG. 8 allows for the bracket to be disposed on the side of the snorkel with similar bolts and guy wire posts (27A, 27B). FIG. 9 incorporates an adapter (24) allowing for attachment to a different kind of bracket—an I-beam bracket (30C). The adapter (24) fits around and over a mounting and is maintained via bolts there through. The I-beam bracket (30C) is a two part construction that defines a slot through which an I-beam or similarly shaped mounting fits. The guy wire posts (27A, 27B) are attached to one separable component of the I-beam bracket (30C) and the guy wire ends are bent to be held within the bracket (30C). FIG. 10 shows an exploded view of this bracket. The guy wires of this invention may be of sufficient dimension to resist deformation to a certain extent, but are pliable enough to form the required curvature when the mountings move. In one embodiment, the guy wires are galvanized steel for added protection.

Figure 11:
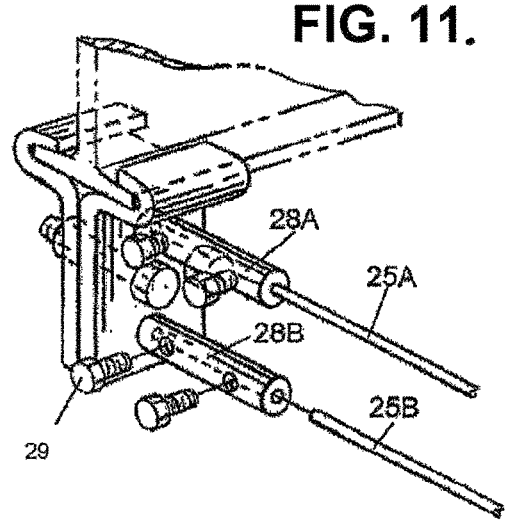
FIG. 11 is an exploded view of the bracket used for installing one end of the suspension apparatus of this invention with guy wires connected in a vertical orientation.

As noted above, it is advantageous for one bracket (23) to have guy wire posts (27A, 27B) oriented horizontally (relative to a supporting surface, such as the ground) and for a different bracket (24) to have guy wire posts (28A, 28B) oriented vertically. FIG. 11 shows the vertical orientation of the guy wire posts (28A, 28B) with guy wires (25A, 25B) held in place via set screws. The separable portions of the I-beam bracket (30B) allow for the setting to be attached to standard support structures, such as the I-beams under a trailer (42).

Figure 12:
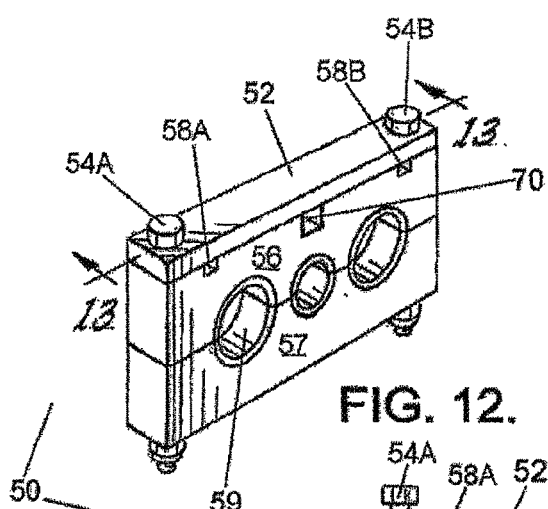
FIG. 12 is an exploded view of the conduit guide used to maintain conduit position according to this invention.
Figure 13:
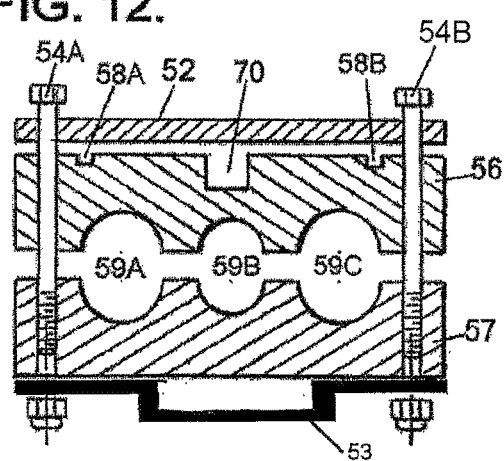
FIG. 13 is a cross section view of the conduit guide of FIG. 12.

FIG. 5 shows the perspective view of the overall suspension apparatus by which conduits (15) are maintained in an elevated position via conduit guides (50A-50E). The conduit guides are shown in detail in FIGS. 12 and 13. In one embodiment, the conduit guides include two separable portions (56, 57) that come together to define bores (59A-59C) through which conduits (15A-15C) run. The dimensions of the bores (59A-59C) are adjustable because the separable portions (56, 57) are connected with threaded bolts (54A, 54B) that allow for measured separation between portions (56, 57). The bores (59) may include a grommet therein for precisely fitting the separable portions around the conduits (15). FIG. 12 shows that a cap plate (52) is also adjustable by the same bolts (54A, 54B). Along with the shape of the top surface of the conduit guide (50), the cap plate (52) defines the passages (58A, 58B) for the guy wires (25A, 25B) and a shackle access (70). A shackle (66) fits through this access (70) to connect at least one of the shackles to the tension cable 65, as shown in FIGS. 14 and 14A. FIG. 13 includes an optional top hat bottom plate (53) for additional conduit or cabling.

Figure 18:
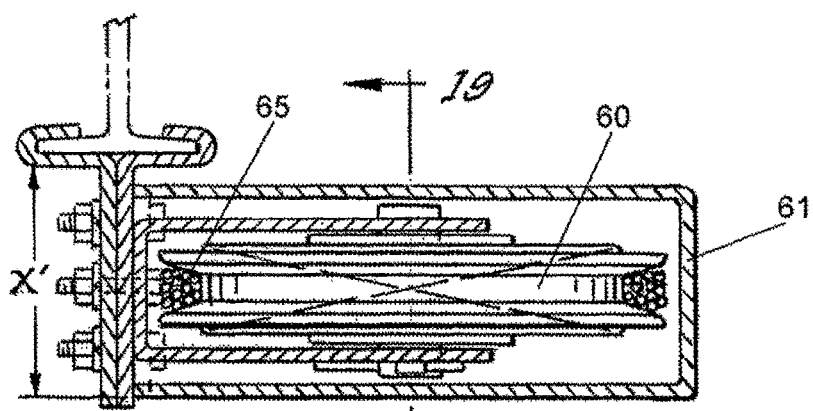
FIG. 18 is a top cross section view of the tension reel box having a horizontal installation according to the invention herein.
Figure 19:
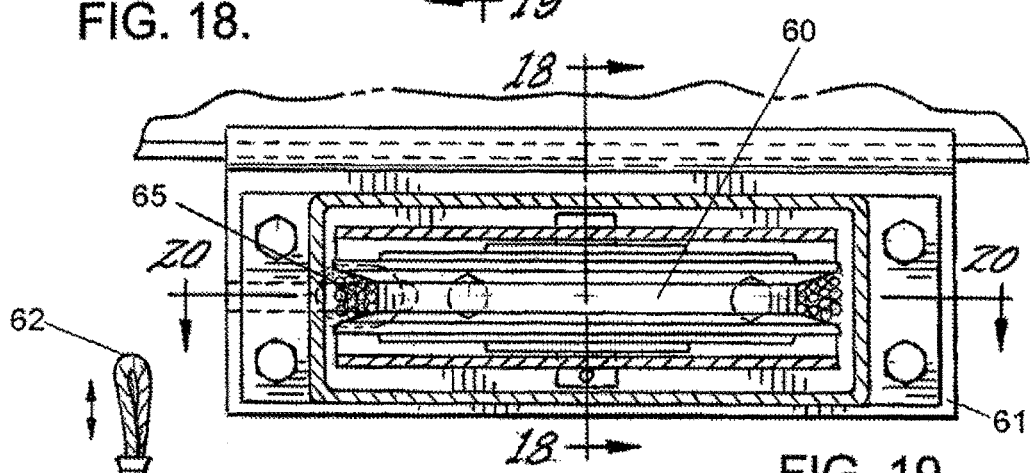
FIG. 19 is a bottom cross section view of the tension reel box of FIG. 18.
Figure 20:
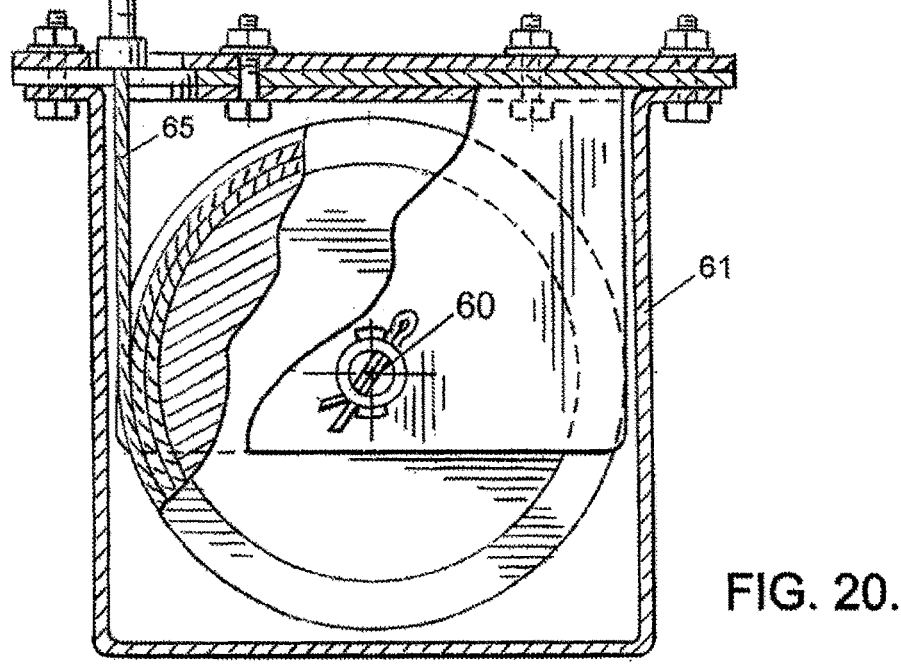
FIG. 20 is a cut-away view of a horizontally oriented tension reel box connected to a mounting plate according to this invention.

FIGS. 15-20 all encompass details of the tension reel (60) and the tension cable (65) wound about the tension reel (60). As shown in FIG. 5, a tension reel (60) ensures that even when the mounting, or a portion of the mounting, moves, the suspension apparatus (17) is maintained in a proper position to elevate the conduits (15). The tension reel is optionally enclosed in a tension reel box (61) for safer installation. An I-beam bracket (300) is used to hold the tension reel box (61) in place. FIGS. 18-20 show a particularly useful embodiment of the tension reel that is installed such that the radius of the reel is horizontal to the trailer and the support surface, or ground. This horizontal embodiment ensures greater clearance from under a mounting surface, such as the bottom of the trailer (42), allows for a larger reel and a longer tension cable, and ensures proper operation in the presence of larger loads on the tension cable (65).

Figure 21:
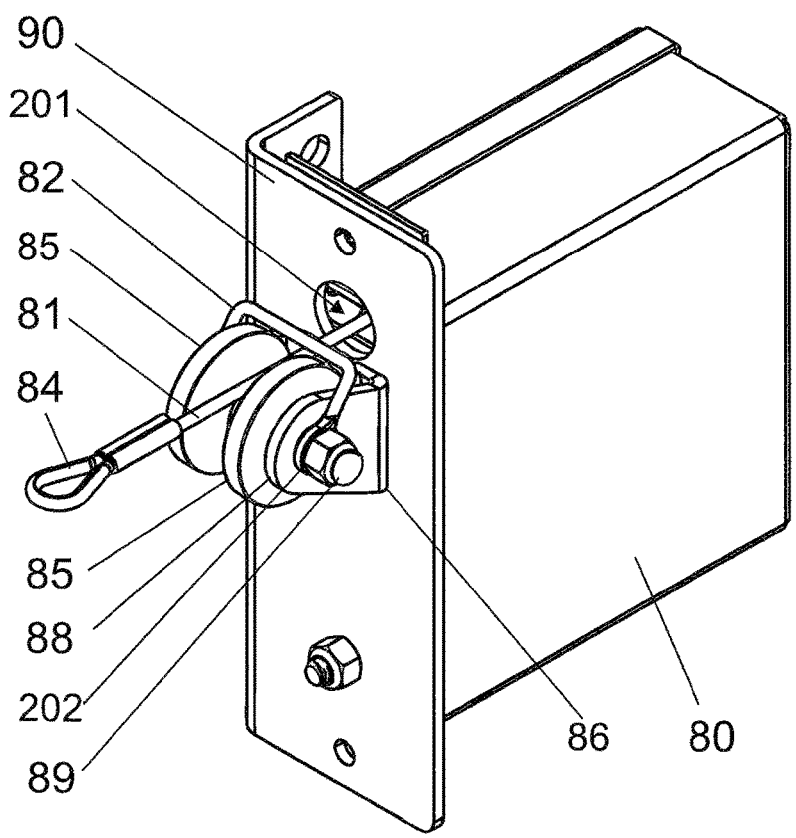
FIG. 21 is a perspective view of a suspension apparatus enclosing a tension reel supporting a tension cable across a roller.
Figure 22:
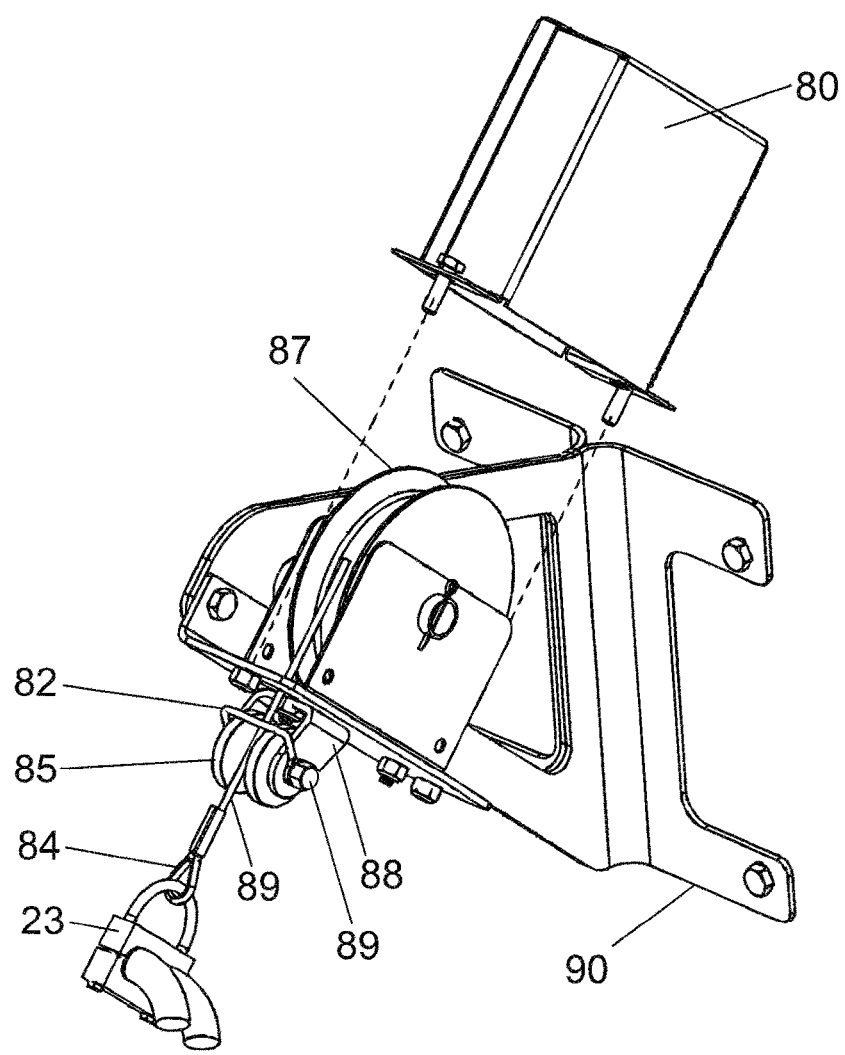
FIG. 22 is an exploded view of the suspension apparatus according to FIG. 21.

FIG. 21 illustrates another embodiment of the suspension apparatus (17) and shows a housing (80) connected to a support mechanism (90) such as a bracket that attaches the housing for use (i.e., attaches the housing to a tractor or a trailer in numerous locations). Continuing to refer to FIG. 21, a suspension apparatus (17) depicts a tension reel (87) connected to the mounting by a support mechanism (90). Additionally, the support mechanism provides a support mechanism aperture (2011 through which a tension cable (81) travels when it is retracted onto the tension reel (87), or when the tension cable (81) is extended from the tension reel (87). The suspension apparatus also includes a tension cable connected to the conduit guide (23) at one end and connected to the tension reel at an opposite end. The length of the tension cable (81) extending off the tension reel (87) adjusts in response to movement of the mounting and controls the associated dislocation of the conduits. A housing (80) surrounds the tension reel (87) and is connected to the support mechanism (90). The housing includes an opening through which the tension cable extends from or retracts onto the tension reel as the tension cable travels through the support mechanism aperture in response to movement of the mounting. A roller assembly is attached to the support mechanism (90) and is comprised of a base (86) attached to said support mechanism (90), a pair of parallel mounting brackets (88) that extend perpendicularly from the base, an axle parallel to the base (86) which has opposing ends (89) that engage the parallel mounting brackets(88), a roller (85) rotatably mounted on the axle, and a latch (82) of unitary construction with opposite ends (202) that are designed and configured to be secured to the mounting brackets(88). Additionally, the latch (82) extends perpendicularly across the roller (85) and thereby defining an open space between the roller to maintain the tension cable (81) in alignment with the roller (85). The roller assembly is designed and configured to maintain proper alignment of the tension cable (81) regardless of any upward or downward movement of the tension cable as it travels across the roller (85) through the support mechanism aperture (201) into the housing (80) and retracted onto the tension reel (87), or as the tension cable (81) extends from the tension reel (87) traveling outside the housing (80) through the support mechanism aperture (201) to and across the roller. FIG. 22 shows an exploded view of the suspension apparatus (17) of FIG. 21 and illustrates that the tension reel (87) may extend the tension cable (81) over a roller (85) to guide the cable into the appropriate location. The embodiment of FIGS. 21 and 22 illustrates that the device can be used without the previously disclosed guy wire and utilizes a single conduit guide (23) engaging hoses and cables found in numerous applications and particularly used in tractors and trailers as noted above. The tension cable (81) may be attached to the conduit guide (23) by an attachment clip (84) connected to one end of the tension cable (81). In order for the tension cable (81) to maintain alignment with the roller (85), a latch (82) may extend over the roller and ensure that the tension cable (81) maintains proper engagement with the roller assembly.

Figure 24:
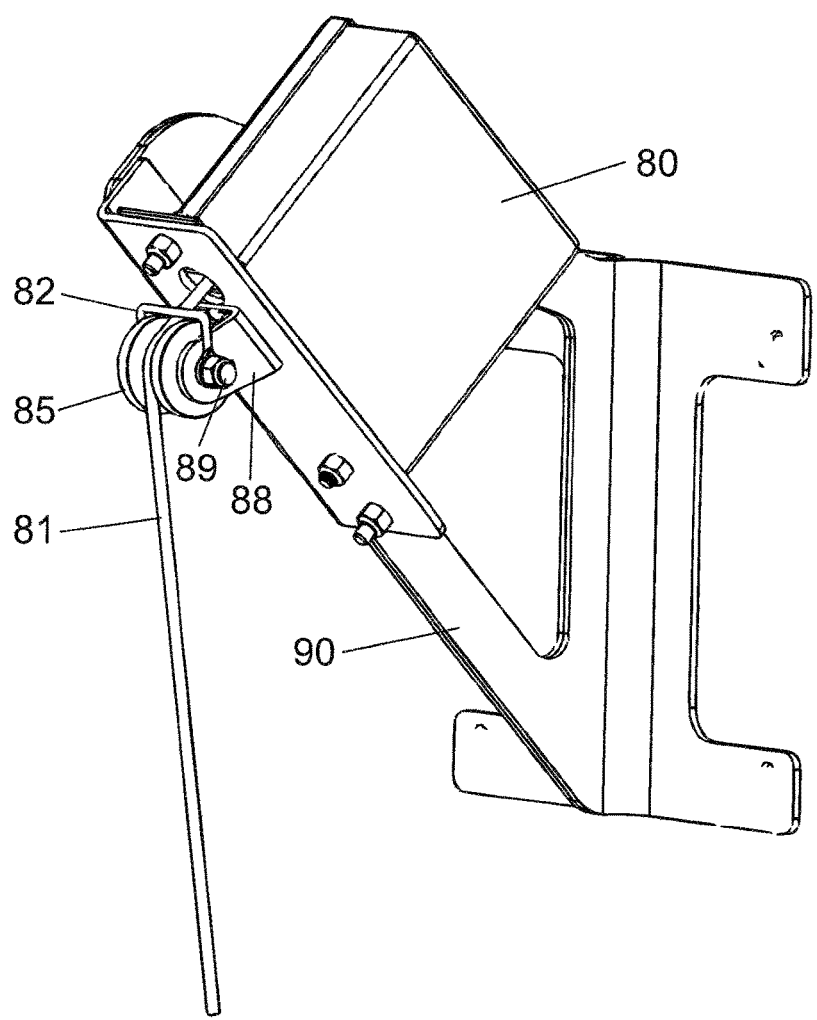
FIG. 24 is a perspective view of a suspension apparatus according to FIG. 21 mounted on a bracket.
Figure 25:
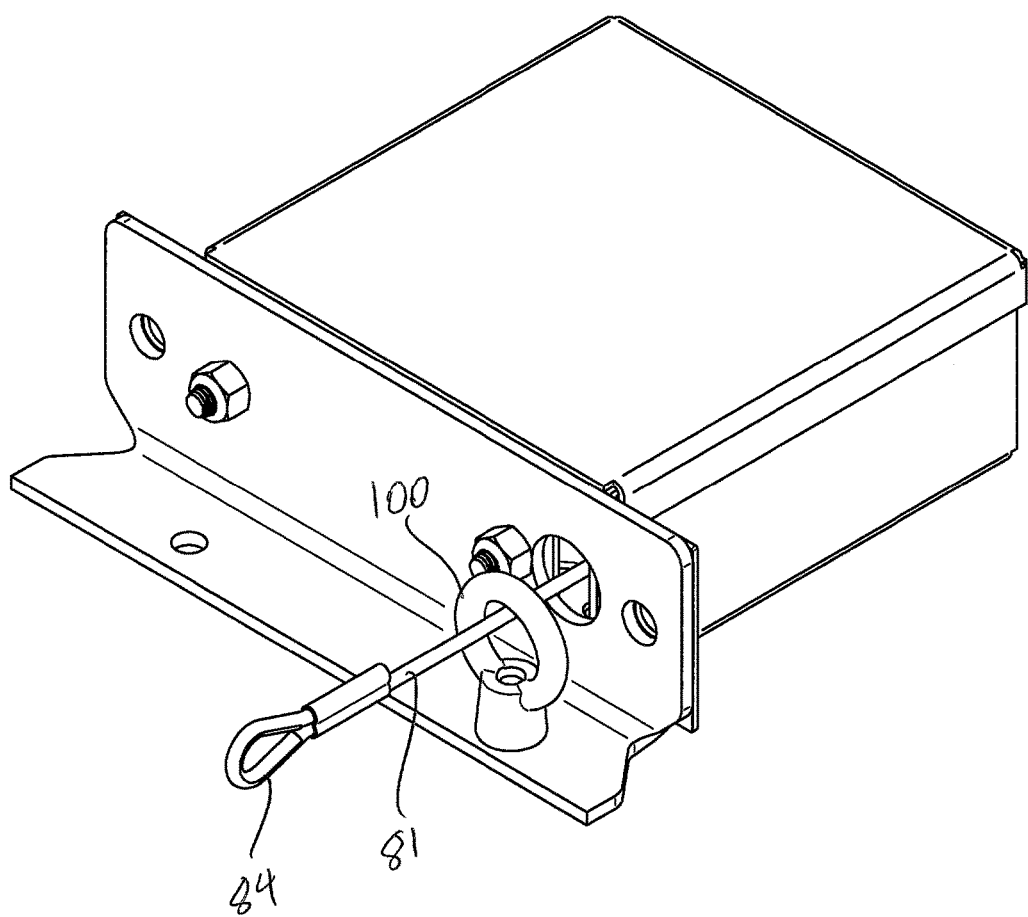
FIG. 25 is a perspective view of a suspension apparatus enclosing a tension reel supporting a tension cable across an eye bolt.

FIG. 25 illustrates that the roller (85) may be replaced with an eye bolt (100) connected to the housing (80) such that the tension cable (81) extends through the eye bolt and ultimately connects to a conduit guide (23). The eye bolt (100) and the latch (82) over the roller (85) ensure that the tension cable (81) may extend out of the housing (80) and toward the conduit guide (23) at significant angles in either an upward or downward direction. Accordingly, the conduit guide (23) and the housing (80) can be placed at any different locations in an installation and can be separated by any particular angle. The tension cable (81), therefore can extend at sharp angles without tangling or hanging on the housing (80), The eye bolt (100) and the latch (82) on the roller (85) provide flexibility in the places where the tension reel (87), the tension reel housing (80), and the conduit guide (23) are placed relative to one another. The placement of the tension reel within a housing (80) may be accomplished with appropriate brackets (90) allowing for proper installation. For example, and without limiting the invention to any one embodiment, the bracket (90) shown in FIG. 22 may be installed on the back of a tractor cab as illustrated in FIG. 24.

Figure 23:
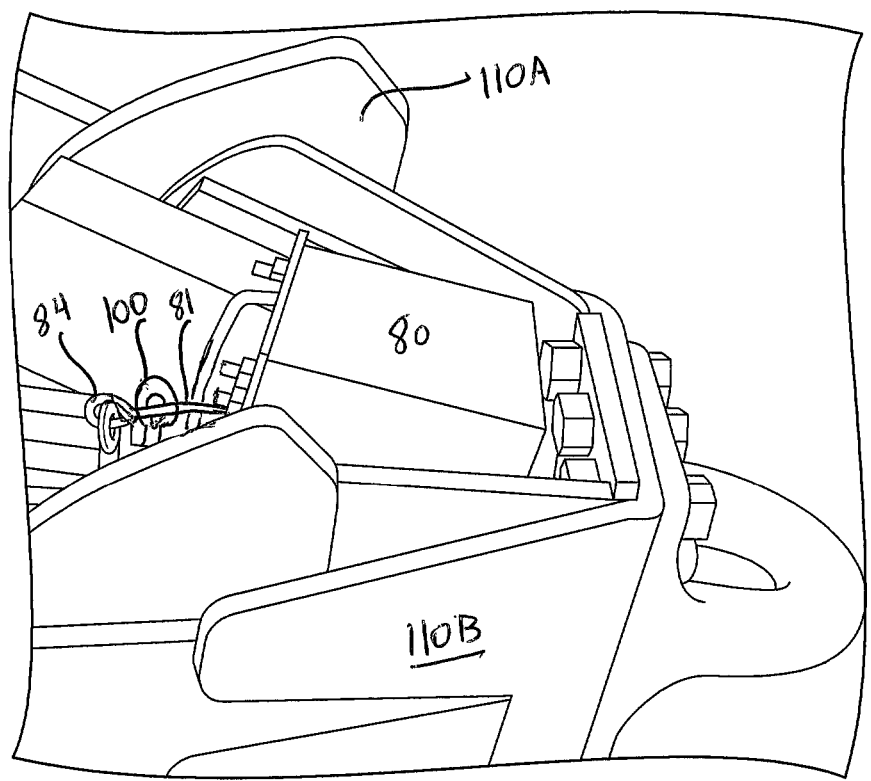
FIG. 23 is a perspective view of a suspension apparatus enclosing a tension reel supporting a tension cable across an eye bolt and positioned within a hitching mechanism with protective wings surrounding the apparatus.

Other kinds of brackets may allow the housing (80) to be installed on other portions of a tractor and trailer combination. In fact, FIG. 23 illustrates that the housing (80) for the tension reel (87) may be installed within a hitching mechanism that connects tandem trailers. When trailers move toward each other for connection by a hitching mechanism, the mechanical portions of the respective trailers may slice or otherwise damage cables and hoses that should be managed by the suspension apparatus (17) disclosed herein. The suspension apparatus (17) therefore may be positioned within a hitching mechanism as shown in FIG. 23. The hitching mechanism may utilize wing portions (110A, 100B) to elevate mechanical links over the suspension apparatus housing (80) as well as associated cables and hoses.

In the specification and drawings, typical embodiments of the invention have been disclosed and, although specific terms have been employed, they have been used in a generic and descriptive sense only and not for purposes of limitation. Different kinds of tubular lines, pumps, solution containers, and other components may be substituted for the parts disclosed herein and still fall within the ambit of the invention. The components may be made of any durable materials that are sufficiently weather resistant (e.g., aluminum, steel, stainless steel, and alloys thereof). The invention is set forth in the claims below.

The invention claimed is:

1. A suspension apparatus for holding a plurality of conduits subject to dislocation relative to an associated moveable mounting, the apparatus comprising:
   at least one conduit guide defining at least one bore through which one of the plurality of conduit is configured to be extended;
   a tension reel connected to the mounting by a support mechanism, said support mechanism defining a support mechanism aperture;
   a tension cable connected to said conduit guide at one end and connected to said tension reel at an opposite end, wherein a length of said tension cable extending off said tension reel is configured to be adjusted in response to a movement of the mounting and controls an associated dislocation of each of said conduits;
   a housing surrounding said tension reel and being connected to said support mechanism, wherein said housing defining an opening through which said tension cable is configured to extend from or retract onto said tension reel as said tension cable travels through said support mechanism aperture in response to movement of the mounting; and
   a roller assembly attached to said support mechanism having
      a base attached to said support mechanism,
      a pair of parallel mounting brackets extending perpendicularly from said base,
      an axle parallel to said base and having opposing ends, said ends of said axle engaging said pair of said parallel mounting brackets,
      a roller rotatably mounted on said axle, and
      a latch of unitary construction having opposite ends designed and configured to be secured to said mounting brackets, wherein said latch extending perpendicularly across said roller defining an open space between the roller to maintain said tension cable in alignment with said roller,
   said roller assembly being designed and configured to maintain proper alignment of the tension cable regardless of any upward or downward movement of said tension cable as the tension cable travels across said roller through the support mechanism aperture into said housing and retracted onto the tension reel or as said tension cable extends from the tension reel traveling outside the housing through the support mechanism aperture to and across said roller.

2. A suspension apparatus according to claim 1, wherein said support mechanism is a bracket for attaching to a tractor or a trailer.

3. A suspension apparatus according to claim 1, further comprising a clamp extending around said tension cable, said clamp engaging said latch to maintain said tension cable on said roller.

4. A suspension apparatus for holding at least one conduit installed on a tractor and trailer combination at an elevated position relative to a ground surface below, the suspension apparatus comprising:
   at least one conduit guide defining at least one bore through which the at least one conduit is configured to extend;
   a tension reel configured to be connected to either the tractor or the trailer by a support mechanism;
   a tension cable connected to said conduit guide at one end and connected to said tension reel at an opposite end, wherein a length of said tension cable extending off said tension reel is configured to adjust in response to movement of the tractor or the trailer and controls an associated dislocation of the at least one conduit;
   a housing surrounding said tension reel and being connected to said support mechanism wherein said housing defining an opening through which said tension cable extends from or retracts onto said tension reel as said tension cable travels through said support mechanism aperture in response to movement of a mounting: and
   a roller assembly attached to said support mechanism having
      a base attached to said support mechanism,
      a pair of parallel mounting brackets extending perpendicularly from said base,
      an axle parallel to said base and having opposing ends, said ends of said axle engaging said pair of said parallel mounting brackets, a roller rotatably mounted on said axle, and a latch of unitary construction having opposite ends designed and configured to be secured to said mounting brackets, wherein said latch extending perpendicularly across said roller defining an open space between the roller to maintain said tension cable in alignment with said roller, said roller assembly being designed and configured to maintain proper alignment of the tension cable regardless of any upward or downward movement of said tension cable as the tension cable travels across said roller through the support mechanism aperture into said housing and retracted onto the tension reel or as said tension cable extends from the tension reel traveling outside the housing through the support mechanism aperture to and across said roller.

5. A suspension apparatus according to claim 4, wherein the at least one conduit comprises a plurality of conduits engaging said conduit guide.

\* \* \* \* \*